United States Patent
Kwak et al.

(10) Patent No.: US 6,402,997 B1
(45) Date of Patent: Jun. 11, 2002

(54) METHOD FOR PREPARING MICROCAPSULE CONTAINING SOLUBLE IRON USING FATTY ACID ESTER

(75) Inventors: Hae-Soo Kwak, 101-601 Hyundai Apt., 70-5 Dunchon-dong, Kangdong-ku, Seoul; Kyung-Mi Yang, Suncheon, both of (KR)

(73) Assignee: Hae-Soo Kwak, Seoul (KR)

( * ) Notice: Subject to any disclaimer, the term of this patent is extended or adjusted under 35 U.S.C. 154(b) by 0 days.

(21) Appl. No.: 09/867,604

(22) Filed: May 31, 2001

(30) Foreign Application Priority Data

Apr. 10, 2001 (KR) ......................... 2001-19048

(51) Int. Cl.$^7$ ............................... D01J 13/02
(52) U.S. Cl. ................. 264/4.1; 264/4.3; 264/4.33
(58) Field of Search ................. 264/4.1, 4.3, 4.33

(56) References Cited

PUBLICATIONS

"Effects of Supplemental Iron and Copper on Lipid Oxidation in Milk. 1 Comparison of Metal Complexes in Emulsified and Homogenized Milk" by Jack Hegenauer et al., J. Agric. Food Chem., vol. 27, No. 4, 1979.

"Spectrophotometric Determination of Serum Iron at the Submicrogram Level with a New Reagent (Ferrozine)" by Paul Carter, Analytical Biochemistry 40, 450–458.

*Primary Examiner*—Samuel A. Acquah
(74) *Attorney, Agent, or Firm*—Birch, Stewart, Kolasch & Birch, LLP

(57) ABSTRACT

Disclosed is a method for preparing a water soluble iron-containing microcapsule by use of fatty acid ester, which is advantageous in terms of shortened preparation process of emulsion and microcapsule, the use of tasteless and odorless fatty acid ester as emulsifier, and increased preparation yield of 95% or more while the microcapsule has the size of 2–5 μm. The method comprises preparing a mixture of a coating agent and iron by mixing polyglycerin stearate with ferric ammonium sulfate in the ratio of 5:1–25:1 and stirring at 500–1200×g for 30 seconds to 2 minutes, said polyglycerin stearate having been mixed with a predetermined amount of water and allowed to stand at 45–60° C. for 5–20 minutes, said polyglycerin stearate and ferric ammonium sulfate serving as the coating agent and iron, respectively; spraying said mixture to a dispersion of 0.01–0.1% surfactant in purified water of 5–10° C. using a sprayer; centrifuging the mixture-sprayed dispersion at 10,000–30,000×g for 5–20 minutes for phase separation; and mixing the lower phase with an equal volume of the dispersion and centrifuging this mixture once or twice.

7 Claims, 1 Drawing Sheet

METHOD FOR PREPARING MICROCAPSULE CONTAINING SOLUBLE IRON USING FATTY ACID ESTER

BACKGROUND OF THE INVENTION

1. Field of the Invention

The present invention relates, in general, to a method for preparing a water-soluble iron-containing microcapsule by use of fatty acid ester. More specifically, the present invention relates to a method for microencapsulating soluble iron, such as ferric ammonium sulfate, ferrous lactate or ferric ammonium citrate, using polyglycerin monostearate (PGMS) as the fatty acid ester.

2. Description of the Prior Art

Of inorganic components present in very small amounts in the human body, iron is susceptible to extreme deficiency in the body. This is because of poor absorption of iron according to insufficient ingestion of iron-containing foods, rapid growth of the body and blood loss, as well as, in the case of females, exhaustion of the stored iron attributed to pregnancy. In human beings, the times at which iron is apt to be deficient are six-months to four-years-old, adolescence, menacme creating menstrual bleeding, and duration of pregnancy, requiring increased amounts of iron. In particular, iron is liable to be deficient in infants and pregnant women. Generally, iron deficiency results in anemia, a loss of energy, impaired mental functions and faculties, a reduction of resistance to disease and infection, an increase of lead poisoning, and a malformed fetus in the case of iron-deficient pregnant women.

In accordance with recent reports associated with iron deficiency, male students were found to have iron-deficiency ratios in the average range of 10% or less, for example, 16.8% at 14 years, 11.5% at 16 years, and 6.5% at 17–18 years. While female students have iron-deficiency ratios of 31.7% at 14 years, 32.1% at 15 years, 42% at 16 years, 35.8% at 17 years, and 39.3% at 18 years. Schoolgirls have twice or more the ratio of iron deficiency than schoolboys, in all age brackets. Commonly, the female is ill-nourished by the diet, in addition to menstrual bleeding, so that iron is deficient in the body. In addition, serious health problems occur when the female has an iron-deficiency ratio of 30% or higher, after 19 years of age, at which growth is stopped. In infants ingesting breast milk as the principal food, health problems such as a drop of brain development may be caused, due to the low iron content (0.53 mg/l) in milk.

As part of the effort to supply iron to general people, iron processed to various forms is added to foods or medicines. However, when a large amount of iron is added to foods, other problems arise because of very low solubility of iron. That is, if iron is directly added to foods such as milk, oxidation of fat in milk causes milk to be acidified, and disagreeable smells, discoloration and precipitation of iron occur. In addition, for addition of iron to foods, iron in the form of stable salts is used but may decrease bioavailability owing to different properties of foods. Also, iron competes with calcium, phosphorous and other trace ions comprising a very small amount of inorganic components in foods, so that absorption of iron into the body is inhibited. Therefore, a stable and effective method for providing iron to the body is required, without lowering quality of foods and inhibiting bioavailability of iron when iron is added to foods.

Conventionally, methods for increasing iron content in foods have been used to directly add iron to foods. However, in order to alleviate problems of conventional methods, it has been tried to microencapsulate iron and apply it to yogurt, infant formula milk powder, cheese and foods. But such attempts to apply microencapsulated iron to various foods are limited. The microcapsule used in the yogurt and infant formula milk powder, has a size of 75 $\mu$m to 100 $\mu$m or larger, and thus may be applied to slurry phase such as yogurt, or powder. But, the microcapsule having such particle size is difficult to apply to foods having low viscosity, such as milk and liquid beverages, because the microcapsule with large particle size is easily precipitated, thus causing the value of the commodity to be lowered, and precipitants in the foods are distasteful to consumers. Additionally, in research for applying such microcapsules to cheese, fat in milk is mixed with stearin and emulsifier (sorbitan monostearate) and thus off-flavor attributed to emulsifier occurs. As such, said research suffers from the disadvantages that the size of the prepared microcapsule (5–10 $\mu$m) is not suitable to apply to milk or liquid beverages, and off-flavor and precipitation occur, so that such capsule cannot be applied to various foods.

SUMMARY OF THE INVENTION

Leading to the present invention, the intensive and thorough research on improvement of conventional microencapsulated iron, carried out by the present inventors aiming to avoid the problems encountered in the prior arts, resulted in the finding that microencapsulated iron prepared according to a method of the present invention is uniformly dispersed when added to milk, thus causing no physical and chemical change of milk during its shelf life (12 days) while having similar taste and color in treated milk to that of untreated milk, without off-taste, off-flavor, and precipitation in treated milk, whereby the same result as with milk can be obtained even though said microencapsulated iron is applied to fruit juice or meats, in which the use of conventional microencapsulated iron is maximized, the quality decrease of foods being prevented, the processes required to prepare emulsion and microcapsules being shortened, and fatty acid ester which is a tasteless and odorless emulsifier is used as a coating agent of iron and thus other emulsifiers need not be used, the diameter of microcapsule being as small as possible and the yield of microcapsules is increased.

Accordingly, it is an object of the present invention to provide a method for microencapsulating iron to the size of 2–5 $\mu$m by use of fatty acid ester, wherein a preparation process of microcapsules is shortened and the yield of microcapsules is improved, thus the microcapsules are easily dispersed when added to milk or liquid beverages, and oxidation of fat in milk or meats is prevented and bioavailability of iron in the body is maximized.

BRIEF DESCRIPTION OF THE DRAWING

The above and other objects, features and other advantages of the present invention will be more clearly understood from the following detailed description taken in conjunction with the accompanying drawing, in which.

DETAILED DESCRIPTION OF THE INVENTION

Figure 1:
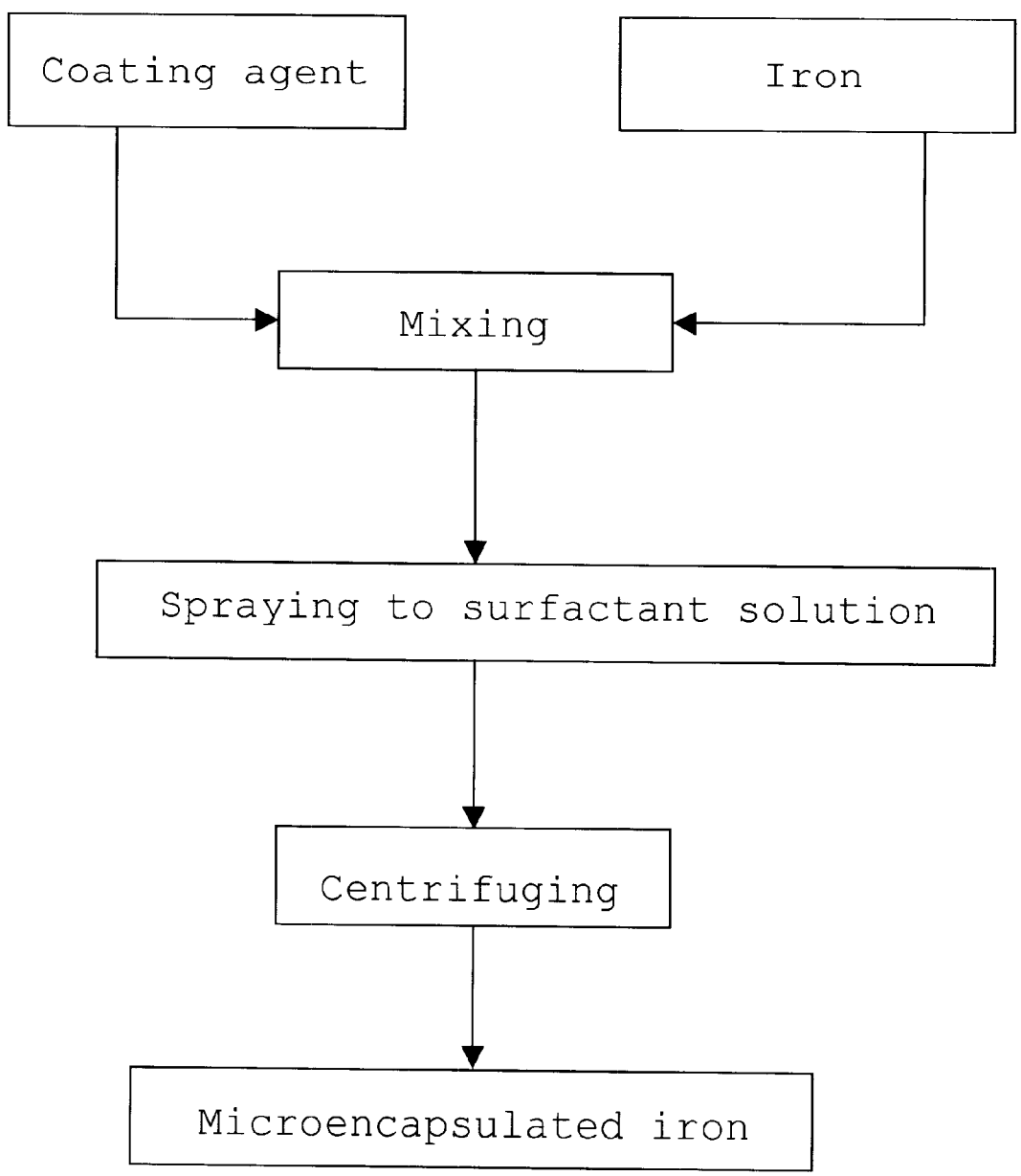
FIG. 1 shows a diagram of processes for preparing an iron-containing microcapsule according to the present invention.

A method for preparing water soluble iron-containing microcapsules using fatty acid ester of the present invention comprises preparing a mixture of a coating agent and iron by mixing water-soluble iron with an admixture of a predetermined amount of purified water and fatty acid ester, said admixture having been allowed to stand for a predetermined time, said fatty acid ester serving as a coating agent; spraying said mixture to a dispersion of surfactant in purified water using a sprayer; centrifuging the mixture-sprayed dispersion for phase separation; and mixing the lower phase with an equal volume of the dispersion of surfactant in purified water and centrifuging this mixture once or twice to obtain microencapsulated iron. The microencapsulated iron is added to foods, and then oxidation degree, stability of microcapsules and bioavailability of iron are measured.

More specifically, the method for preparing microencapsulated iron by use of fatty acid ester is as follows.

(1) Mixing Coating Agent With Iron

The coating agent and iron used for the microencapsulation method of the present invention are fatty acid ester and water soluble ferric ammonium sulfates, respectively. In addition to these components which are food additives, use may be made of other fatty acid esters and iron salts for the microencapsulation method of the present invention. Fatty acid esters useful as the coating agent comprise polyglycerin monostearate, sorbitan monolaurate, sorbitan monostearate, sorbitan monorate, glycerol monostearate, and MCT (medium chain triglyceride) In the present invention, polyglycerin monostearate (PGMS, produced by Il Shin Emulsifier Co., Ltd.) which is a tasteless, odorless and nontoxic food additive is used as the coating agent of iron. Iron is exemplified by hemi ferrous, ferric citrate, ferric pyrophosphate, ferric ammonium sulfate, and ferrous lactate. Of them, ferric ammonium sulfate (Sigma Chemical Co., St Louis, Mo. USA) is used as iron having good solubility in water. PGMS which is solid at a room temperature is added with a predetermined amount of purified water and then let stand at 45–60° C., to completely dissolve PGMS. Thereafter, PGMS and ferric ammonium sulfate are mixed at the ratios of 25:1, 20:1, 15:1, 10:1, and 5:1. In order to fully mix iron with PGMS, the mixture is stirred at 500–1200×g for 30 seconds to 2 minutes. Since a sprayer is not smoothly operated at high temperatures, the mixing is conducted at 45–60° C. and then stirring is performed at high speeds.

(2) Separating Mixture-sprayed Dispersion

To manufacture a protective capsule using fatty acid ester under high pressure, the mixture comprising PGMS, ferric ammonium sulfate and purified water is sprayed to the dispersion of 0.01–0.1% Tween-60 (polyoxyethylene sorbitan monostearate) in water by use of a sprayer. The mixture-sprayed dispersion is centrifuged at 10,000–30,000×g for 5–20 minutes for phase separation.

(3) Preparing Microcapsules

The lower phase is mixed with an equal volume of a dispersion of Tween-60 in water and then centrifugation is carried out once or twice to remove non-encapsulated iron, thereby obtaining iron-containing microcapsules of 2–5 μm.

(4) Measuring Yield of Microencapsulated Iron

The non-encapsulated iron in the upper phase obtained from centrifugation of the mixture-sprayed dispersion for microencapsulating iron, is quantitatively analyzed using ICP (inductively coupled plasma) spectrometer, to indirectly obtain the yield of the microencapsulated iron.

(5) Measuring Oxidation Degree of Microencapsulated Iron

A predetermined amount of microencapsulated iron is mixed with milk and thus uniformly dispersed in milk. During storage of the dispersion at 4° C. for 5 days, the oxidation degree of milk was measured periodically by use of a TBA (thiobarbituric acid) method (J. Agric. Food Chem., Vol. 27. No. 4, 1979). The amount of produced MDA (malondialdehyde) is calculated as $\mu$M and shown as a ratio.

(6) Investigating Stability of Microcapsules in Artificial Gastric Juice

In order to investigate the stability of microencapsulated iron in acid, 100 ppm iron is mixed with distilled water and then added with pepsin solution (pH 1.2), followed by adjusting pH of the mixture to 2.0, 3.0, 4.0, 5.0 and 6.0 by use of 2 N NaOH. While such solutions are shaken at 37° C. for 1 hour, the amount of the released iron is measured.

(7) Investigating Stability of Microcapsule in Artificial Small Intestine Juice

The solutions with different pH, obtained from said artificial gastric juice, are added with bile salts and pancreatic solution, followed by shaking the reaction at 37° C. for 1 hour. The amount of iron released at 20 minute intervals is measured.

(8) Assaying Absorption of Iron

Bioavailability of encapsulated iron is assayed with Ferrozine assay (Anal. Biochem., 10, 450–458, 1971). 1 ml of sample is mixed with 3 ml of 0.02 g ascorbic acid in 0.01 N HCl solution and then let stand at room temperature for 10 minutes. Said mixture is added with 10% ammonium acetate, and then with 3 ml of 1 mM ferrozine coloring reagent (3-2-(pyridyl)-5,6-diphenyl-1,2,4-triazone-p,p'-disulfonic acid, Aldrich Chem. Co., Milwaukee, Wis.) in distilled water, which is then let stand in dark room for 20 minutes and added with 2 ml of distilled water, followed by measuring absorbance at 562 nm.

A better understanding of the present invention may be obtained in light of the following examples which are set forth to illustrate, but are not to be construed to limit the present invention.

EXAMPLE 1

In order to measure the yields of iron-containing microcapsule according to mixing ratios of PGMS and iron, PGMS and ferric ammonium sulfate as the iron were mixed in the ratios of 25:1, 20:1, 15:1, 10:1, and 5:1, and then dissolved in a predetermined amount of distilled water. The PGMS solution was allowed to stand at 50° C. for 10 minutes, followed by stirring at 1,000×g for 2 minutes. The mixture comprising PGMS, ferric ammonium sulfate and distilled water was sprayed to a dispersion of 0.05% surfactant (Tween-60 or Tween-80) in purified water of 8° C. by use of a spray gun, and then centrifuged at 20,000×g for 10 minutes for phase separation. The lower phase was mixed with an equal volume of the dispersion of surfactant in water and centrifuged twice, to yield 100 ml of microencapsulated iron.

The yield of iron-containing microcapsules is 95.2% when the ratio of PGMS to iron is 25:1, 94.6% when the ratio is 20:1, 93.0% when the ratio is 15:1, 91.5% when the ratio is 10:1, and 90.6% when the ratio is 5:1. As the amount of added PGMS is increased, the yield of iron-microcapsules containing microcapsules becomes higher. The results are given in Table 1, below.

TABLE 1

YIELD OF MICROCAPSULES ACCORDING TO RATIOS OF PGMS AND IRON

| Ratio (w/w) | | Yield (%) |
| --- | --- | --- |
| PGMS | Iron (ferric ammonium sulfate) | |
| 25 | 1 | 95.2 |
| 20 | 1 | 94.6 |
| 15 | 1 | 93.0 |
| 10 | 1 | 91.5 |
| 5 | 1 | 90.6 |

150 iron-containing microcapsules prepared by said example was contained in milk and then stored at 5° C. for 12 days, whereby thusly obtained milk was compared with common commercially available milk for precipitation of iron. Results were no 'precipitation' at 1 to 6 days after microcapsule addition, and 'a little precipitation' on the 9 days, and 'normal precipitation' on the 12 days. The results are presented in Table 2, below.

TABLE 2

PRECIPITATION DEGREE OF IRON IN 150 ppm MICROENCAPSULATED IRON-CONTAINING MILK

| Storage duration (day) | Precipitation Degree |
| --- | --- |
| 1 | − |
| 3 | − |
| 6 | − |
| 9 | + |
| 12 | ++ |

−: no precipitation
+: a little precipitation
++: normal precipitation
+++: high precipitation
++++: very high precipitation

TEST EXAMPLE 2

To compare 150 ppm microencapsulated iron-containing milk with common commercially available milk for off-flavor, test subjects comprising 20 persons tested the flavor of the milk. As the results "no off-flavor" was reported by 20 persons on day 1, 19 persons on day 3, 17 persons on day 6, 15 persons on day 9 and 13 persons on day 12. "A little off-flavor" was reported by 0 person on day 1, 1 person on day 3, 3 persons on day 6, 3 persons on day 9, and 5 persons on day 12. Additionally, "normal off-flavor" was reported by 0 person on days 1–6, 2 persons on day 9, and 2 persons on day 12. The results are shown in the following Table 3.

TABLE 3

FLAVOR TEST OF 150 ppm MICROENCAPSULATED IRON-CONTAINING MILK

| Items | Storage duration (day) | | | | |
| --- | --- | --- | --- | --- | --- |
| | 1 | 3 | 6 | 9 | 12 |
| No off-flavor | 20 | 19 | 17 | 15 | 13 |
| A little off-flavor | 0 | 1 | 3 | 3 | 5 |
| Normal off-flavor | 0 | 0 | 0 | 2 | 2 |
| Severe off-flavor | 0 | 0 | 0 | 0 | 0 |

TEST EXAMPLE 3

During storage of 60 ppm and 150 ppm microencapsulated iron-containing milk at 4° C., it is believed that the degree of fat oxidation is affected by the microencapsulated iron. Therefore, the degree of fat oxidation was evaluated as a TBA level. On day 5 of storage of milk, TBA levels of non-encapsulated iron-containing milk and encapsulated iron-containing milk were 0.05 and 0.15 at 60 ppm iron, and 0.77 and 0.3 at 150 ppm iron, respectively. From the test result, it is seen that the TBA level of encapsulated iron-containing milk is much higher than that of non-encapsulated iron-containing milk. In addition, because of microencapsulation of iron, the fat oxidation is slowly carried out, thus increasing fat stability. The result is shown in the following Table 4.

TABLE 4

TBA LEVELS OF 60 ppm and 150 ppm MICROCAPSULATED IRON-CONTAINING MILK DURING STORAGE

| Items | Iron Conc. | Storage duration (day) | | |
| --- | --- | --- | --- | --- |
| | | 1 | 3 | 5 |
| Non-encapsulated iron-containing milk | 60 ppm | 0.10 | 0.32 | 0.50 |
| | 150 ppm | 0.15 | 0.53 | 0.77 |
| Encapsulated iron-containing milk | 60 ppm | 0.12 | 0.13 | 0.15 |
| | 150 ppm | 0.15 | 0.21 | 0.30 |

TEST EXAMPLE 4

150 ppm microencapsulated iron-containing orange juice was stored at 5° C. for 30 days, and then precipitation of iron was observed. On days 5 to 15 of storage of orange juice, there is "no precipitation", on day 20, there is "a little precipitation", and on day 30, there is "normal precipitation". The result is given in the following Table 5.

TABLE 5

PRECIPITATION DEGREE OF IRON IN 150 ppm MICROENCAPSULATED IRON-CONTAINING ORANGE JUICE DURING STORAGE

| Storage duration (days) | Precipitation Degree |
| --- | --- |
| 5 | − |
| 10 | − |
| 15 | − |
| 20 | + |
| 30 | ++ |

−: no precipitation
+: a little precipitation
++: normal precipitation
+++: high precipitation
++++: very high precipitation

TEST EXAMPLE 5

150 ppm microencapsulated iron-containing orange juice was stored at 5° C. for 30 days, and then test subjects comprising 20 persons tested the off-flavor of orange juice. As the result, "no off-flavor" was reported by 20 persons on day 5, 20 persons on day 10, 20 persons on day 15, 18 persons on day 20 and 15 persons on day 30. "A little off-flavor" was reported by 0 person on day 5, 0 person on day 10, 0 person on day 15, 2 persons on day 20, and 4 persons on day 30. Also, "normal off-flavor" was reported by 0 person on days 5–20, and 1 person on day 30. The results are shown in the following Table 6.

TABLE 6

FLAVOR TEST OF 150 ppm MICROENCAPSULATED
IRON-CONTAINING ORANGE JUICE

| | Storage duration (day) | | | | |
|---|---|---|---|---|---|
| Items | 5 | 10 | 15 | 20 | 30 |
| No off-flavor | 20 | 20 | 20 | 18 | 15 |
| A little off-flavor | 0 | 0 | 0 | 2 | 4 |
| Normal off-flavor | 0 | 0 | 0 | 0 | 1 |
| Much severer off-flavor | 0 | 0 | 0 | 0 | 0 |

TEST EXAMPLE 6

To investigate acid stability of iron-containing microcapsules, artificial gastric juice was prepared and the amount of iron released from the microcapsules (%) was measured. The amounts of iron released at acidic pH when foods are not eaten and at neutral pH when foods are eaten were investigated, respectively. As the result, the amount of iron released at pH 2.0 is 15%, which is more than the amount released at pH 6.0. The reason why more iron is released at low pH is that fatty acid ester is unstable in acid. Commonly, iron is eaten, together with foods, so that iron release by acid is very small 5%. The results are presented in Table 7, below.

TABLE 7

AMOUNT OF MICROENCAPSULATED IRON RELEASED IN
ARTIFICIAL GASTRIC JUICE AFTER 1 HOUR AT 37° C.

| | PH | | | | |
|---|---|---|---|---|---|
| Item | 2 | 3 | 4 | 5 | 6 |
| Released iron amount (%) | 15 | 11 | 4 | 5 | 5 |

TEST EXAMPLE 7

In order to investigate the stability of iron-containing microcapsule prepared in the example, artificial small intestine juice was prepared at 37° C. and the amount of iron released from the microcapsules (%) was measured at 20 minute intervals for 1 hour. Absorption of iron is mostly conducted within the duodenum in the small intestine, so that encapsulated iron can be favorably released by activities of lipases, proteases, and other enzymes. At neutral pH, large amounts of iron were released upon incubation in the artificial small intestine juice. The longer the reaction time, the more the amount of iron released by activity of enzymes. The amount of released iron was 3% at an initial pH 2, and 91% following 60 minutes at pH 6. 30 times more encapsulated iron was isolated at neutral pH compared to the amount at acidic pH. The results are given in the following Table 8.

TABLE 8

AMOUNT OF MICROENCAPSULATED IRON RELEASED
FROM ARTIFICIAL SMALL INTESTINE JUICE

| | PH | | | | |
|---|---|---|---|---|---|
| | 2 | 3 | 4 | 5 | 6 |
| | Item | | | | |
| | Released Iron Amount (%) | | | | |
| Time (min.) | | | | | |
| 0 | 3 | 3 | 5 | 12 | 15 |
| 20 | 12 | 18 | 20 | 27 | 31 |
| 40 | 18 | 22 | 40 | 57 | 81 |
| 60 | 30 | 46 | 60 | 76 | 91 |

TEST EXAMPLE 8

As iron is required to perform almost all metabolic processes in the living body, its concentration in the body as well as its bioavailability is important in evaluating the practical efficiency of iron supplements. So, the iron-containing microcapsules were assayed for iron absorbance in the body.

500 cc of each of non-encapsulated iron (200 ppm)-added milk, and encapsulated iron (200 ppm)-added milk was drunk by 20 persons. After 6 hours, blood samples were taken and then their iron concentrations were measured using a standard curve plotted by Ferrozine assay and averaged. The absorption efficiency of iron was determined to be 15.33±0.15% when non-encapsulated iron was consumed, and 36.67±0.25% when the encapsulated iron was consumed. From these results, it can be confirmed that the absorption efficiency of the encapsulated iron is twice as high as the non-encapsulated iron. The results are shown in Table 9, below.

TABLE 9

ABSORPTION EFFICIENCY OF
MICROENCAPSULATED IRON IN THE BODY

| Item | Absorption Efficiency of Iron (%) |
|---|---|
| Non-encapsulated iron | 15.33 ± 0.15 |
| Encapsulated iron | 36.67 ± 0.25 |

It is believed that components for aiding or limiting absorption of iron co-exist in the foods, so that the related interaction is variously generated and thus may affect absorption of iron, that is, bioavailability of iron, but the most important factor governing bioavailability of iron is solubility, and the above result demonstrates that the encapsulated iron can be effectively absorbed by the mucosa of the small intestines, compared to non-encapsulated iron.

The microencapsulated iron prepared according to the method of the present invention is stable in acid and decomposed only under optimal conditions by lipase, thus increasing absorption efficiency of iron in the human body. Additionally, the microcapsule can be uniformly dispersed when added to foods without changing physical properties of foods. So, the microencapsulated iron of the present invention has the advantage of iron-reinforcement upon addition to milk, liquid beverages and processed foods.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing water soluble iron-containing microcapsules using fatty acid ester, comprising the following steps of:

preparing a mixture of a coating agent and iron by mixing water-soluble iron with an admixture of a predetermined amount of purified water and fatty acid ester, said admixture having been allowed to stand for a predetermined time, said fatty acid ester serving as a coating agent;

spraying said mixture to a dispersion of surfactant in purified water using a sprayer;

centrifuging the mixture-sprayed dispersion for phase separation; and mixing the lower phase with an equal volume of the dispersion of surfactant in purified water and centrifuging this mixture once or twice to obtain microencapsulated iron.

2. The method as defined in claim 1, wherein 5–25 parts by weight of the coating agent is mixed with 1 part by weight of water-soluble iron, allowed to stand at 45–60° C. for 5–20 minutes, and stirred at 500–1200×g for 30 seconds to 2 minutes, thereby preparing the mixture.

3. The method as defined in claim 1, wherein the mixture of the coating agent and iron is sprayed to the dispersion of 0.01–0.1% surfactant in purified water at 5–10° C. by use of a sprayer.

4. The method as defined in claim 1, wherein the mixture-sprayed dispersion is centrifuged at 10,000–30,000×g for 5–20 minutes for phase separation.

5. The method as defined in claim 1, wherein said fatty acid ester useful as the coating agent is selected from the group consisting of polyglycerin monostearate, sorbitan monolaurate, sorbitan monostearate, sorbitan monorate, glycerol monostearate, MCT and mixtures thereof.

6. The method as defined in claim 1, wherein said water-soluble iron is selected from the group consisting of hemi ferrous, ferric ammonium sulfate, ferric ammonium citrate, ferric pyrophosphate, ferrous lactate, and mixtures thereof.

7. The method as defined in claim 1, wherein the microencapsulated iron has a size of 2–5 $\mu$m.

* * * * *